July 21, 1942.                C. R. HUBBARD                2,290,640
                    METHOD OF MAKING MACHINERY PACKING
            Original Filed April 26, 1940        2 Sheets-Sheet 2

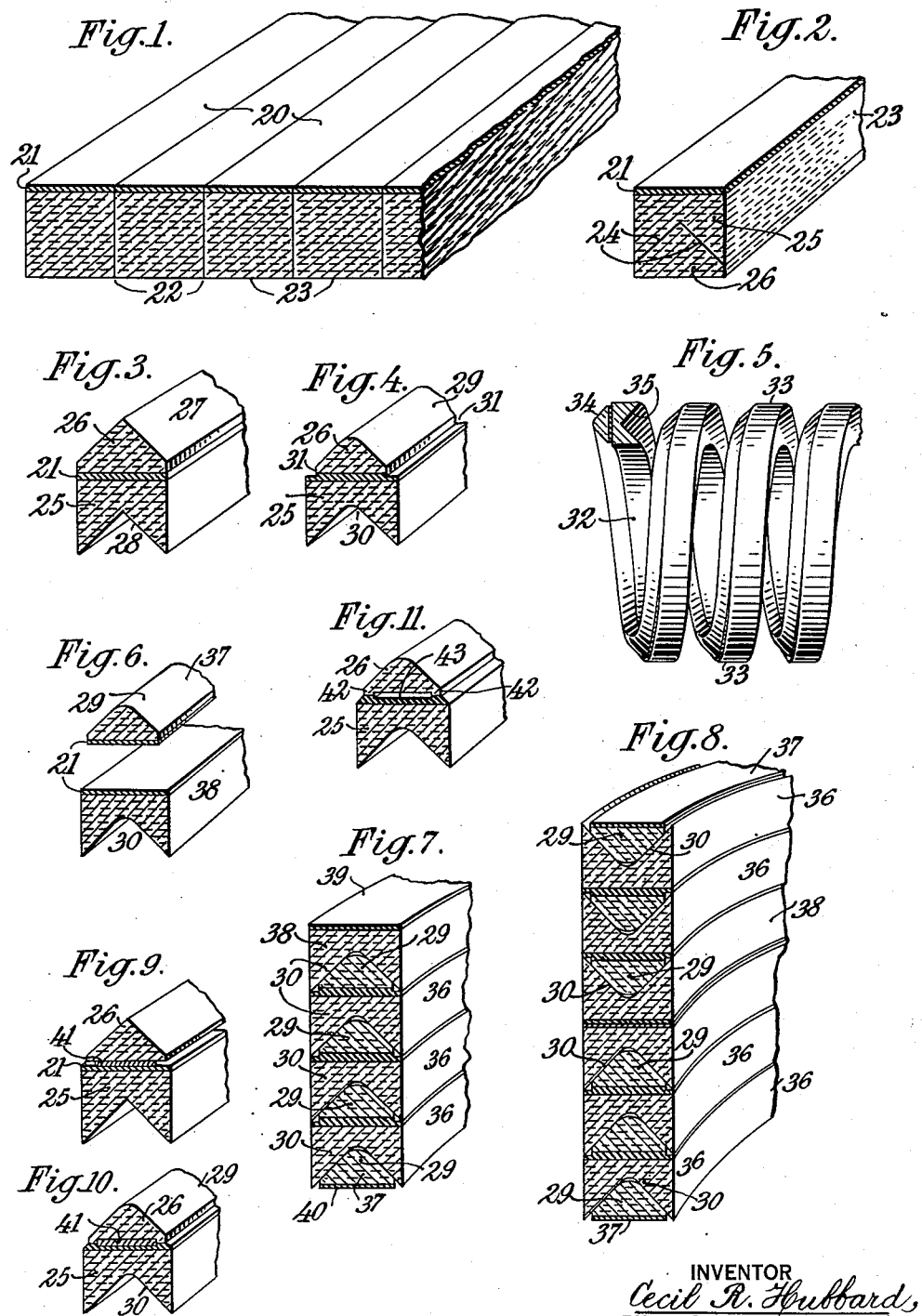

INVENTOR
Cecil R. Hubbard,
BY
Fraser, Myers & Manley.
ATTORNEYS.

Patented July 21, 1942

2,290,640

UNITED STATES PATENT OFFICE 2,290,640

METHOD OF MAKING MACHINERY PACKING

Cecil R. Hubbard, Palmyra, N. Y., assignor to The Garlock Packing Company, Palmyra, N. Y., a corporation of New York Original application April 26, 1940, Serial No. 331,696. Divided and this application October 12, 1940, Serial No. 360,901

7 Claims. (Cl. 154—33.1)

This application is a division of my copending application, Serial No. 331,696, filed April 26, 1940 (now Patent No. 2,256,343, dated Sept. 16, 1941), pertaining to improvements in machinery packing material and methods of making such material. It has particular application to methods to be employed in the manufacture of machinery packing which has been sold to the trade as "automatic" packing.

As an illustration of what is referred to herein as automatic packing, reference may be had to the patent to Hubbard et al., No. 1,771,890, from which it will be observed (see Fig. 1) that each of the packing rings 20 has lateral surfaces, one of which is concave and the other convex. The rings are so positioned that the pressure of the fluid, the escape of which it is the purpose of the packing to prevent, will be forced between the successive rings of the assembly and will be caused to force the angular lips in contact with the piston into frictional engagement therewith, which will vary in accordance with such pressure. As the pressure increases, the effectiveness of the seal afforded by the packing will increase; as the pressure falls off, the frictional engagement between the packing and the piston surface will decrease.

It may be noted that when using packing of this character (see, again, Fig. 1 of the above-mentioned patent to Hubbard et al.), it is necessary to provide adapter rings, such as the rings 21, 22, at the ends of the assembly, in order to provide plane surfaces to conform with opposing surfaces 33, 34 of the stuffing-box.

When manufacturing packing having plane, lateral surfaces, such as is disclosed in the Trumbull patent, No. 1,455,682, the necessity to provide end adapter rings of special form does not arise, and the packing may be manufactured in coils from which any desired number of rings may be cut at will and used as a complete packing assembly. It has been found impracticable to make and sell automatic packing, such as is illustrated in the above-mentioned patent to Hubbard et al., in coiled strips of material length from which packing rings may be cut as required, because of the need for the specially formed end adapter rings.

It is one of the principal objects of this invention to provide a practical process of manufacturing strip material adapted to be stored and shipped in coils, from which any desired number of packing rings may be cut, the material being of a character such that any section cut from the coil may be readily separated into parts of cross-sectional form such as to serve as end adapter rings for a packing assembly.

In the following description of methods of making packing materials in accordance with the herein-disclosed invention, reference will be had to the accompanying drawings in which—

Figure 1 is a representation of a fragment of a slab of material which may be subdivided into strips from each of which stock may be made as a result of further treatment in accordance with the process of the invention;

Fig. 2 is a representation of a fragment of one of the strips which may be cut from the slab illustrated by Fig. 1;

Fig. 3 is a representation of a fragment of material resulting from the reassembly of separated parts of the material illustrated by Fig. 2;

Fig. 4 is a representation of a fragment of material resulting from the molding and vulcanization of the material illustrated by Fig. 3;

Fig. 5 is a representation of part of a coil of the strip material illustrated by Fig. 4;

Fig. 6 is a representation of fragments of parts of the material resulting from the severance of a section of the stock illustrated by Fig. 5;

Fig. 7 represents a fragment of a packing assembly comprising a plurality of rings of the stock illustrated by Fig. 5 associated with end adapter rings of separated parts of such stock as indicated by Fig. 6;

Fig. 8 is a representation of a packing assembly adapted, when assembled in a stuffing-box, to resist a flow of fluid in either of two directions, said assembly consisting of rings cut from the stock illustrated by Fig. 5 associated with centrally disposed and end adapter elements consisting of separated parts such as are indicated by Fig. 6;

Fig. 9 represents a fragment of elements conforming with those illustrated by Fig. 3 associated with an additional element, which, by further treatment, may be developed into a modified form of packing stock illustrated by Fig. 11;

Fig. 10 represents a fragment of material resulting from the molding and vulcanization of the assembly illustrated by Fig. 9, but prior to the removal of the added element to produce the final product;

Fig. 11 represents a fragment of finished stock resulting from the withdrawal of the metal strip included as an element of the partly completed stock illustrated by Fig. 10;

Figure 13:
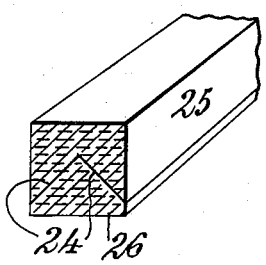
Fig. 13 is a representation of a fragment of one of the strips of material which may be cut from the slab illustrated by Fig. 12.
Figure 14:
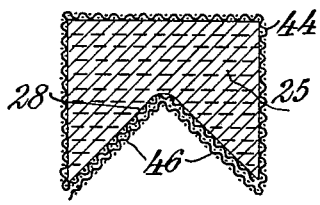
Figure 16:
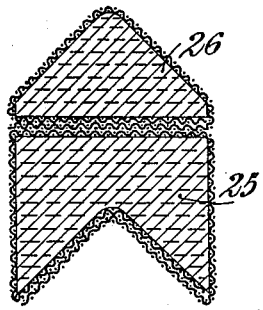
Figure 15:
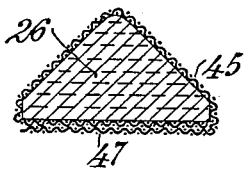

Figs. 14 and 15 represent in cross section separated parts of a strip of material such as is illustrated by Fig. 13, each enveloped by a covering of fabric and partly vulcanized in order to resist changes of form during further treatment; and Fig. 16 represents in cross section a reassembly of the parts illustrated by Figs. 14 and 15, the same having been united and further vulcanized to produce a finished product.

Although the herein-disclosed invention is intended to be of more or less general application, it will be exemplified by disclosures of methods of making various forms of stock pertaining specifically to piston-rod packing adapted to be assembled in an ordinary stuffing-box.

Having reference first to the species of the invention to be described with the aid of Figs. 1 to 8, inclusive, Fig 1 represents a fragment of a slab of material 20 of properties such that, by appropriate curing treatment, it may be caused to have the physical characteristics of resilient, vulcanized rubber composition. To one of the two surfaces of this slab of most extensive area is applied a thin layer 21 of tacky material which, when vulcanized, may serve as a binding means of relatively weak texture as compared with the texture of the body portion of the slab.

The slab 20 may be of relatively great length and of a width such that it may be severed by cutting along planes 22 into a plurality of strips 23, a fragment of one of which is illustrated by Fig. 2, said strips being of a cross-sectional area such that they may be developed by further treatment into a finished packing stock of predetermined dimensions embodying the invention.

The strip 23, as illustrated by Fig. 2, may be severed lengthwise by a V-shaped cut 24 into two parts 25, 26, of forms approximating their intended forms as elements of a finished product, which may be separated and reassembled in the relative positions illustrated by Fig. 3, with the protuberant angular portion 27 facing in one direction and the reentrant angular portion 28 facing in the opposite direction.

In view of the tacky character of the unvulcanized elements 25, 26, and the intervening layer of tacky material 21, the reassembled elements of the structure illustrated by Fig. 3 may, by a relatively slight degree of pressure, be caused to unite so as to be handled as a single product during further treatment.

The reassembled strip of material illustrated by Fig. 3 may next be subjected to a molding treatment such as to convert it into a product a fragment of which is illustrated by Fig. 4, said product having complementary convex and concave surface portions 29, 30, facing in opposite directions; and, preferably, as a part of the same step of the treatment, the molded product will be vulcanized to the desired physical consistency.

Preferably, the molding treatment will be such as to cause the product, as illustrated by Fig. 4, to have longitudinally disposed, reentrant angular portions 31 at the opposite sides of the base of the part 26 having the convex surface portion 29.

The stock, a fragment of which is illustrated by Fig. 4, may be developed during its manufacture into a coil, preferably a helical coil 32 (Fig. 5), of a diameter appropriate for its intended use, and if, as herein specifically disclosed, the material is to be used as stock to be cut into rings for packing assemblies to be assembled in an ordinary stuffing-box, the axis of the coil may, as has been indicated, be so disposed with respect to the surfaces of the material as to have outer and inner cylindrical surfaces 33, 33, and laterally disposed, convex and concave surfaces 34, 35.

With a coil 32 (Fig. 5) of stock such as that illustrated in Fig. 4 as a source of supply, rings 36 of a packing assembly (Fig. 7) may be cut and mounted in an ordinary stuffing-box with their adjacent convex and concave surface portions 29 and 30 nested one within another, and a single ring cut from the same coil of stock may be readily separated, as indicated by the fragmentary illustration, Fig. 6, into two parts 37, 38, due to the relatively weak texture of the layer of binding material 21. These elements 37 and 38 are of forms such as to serve as adapter rings for the ends of the packing assembly illustrated by Fig. 7, the convex portion 29 of ring 37 being nested in the concave portion 30 of one end ring 36 of the assembly, and the concave portion 30 of the other element 38 being caused to cap the convex portion 29 of the other end ring 36 of the assembly.

These adapter rings 37, 38 thus serve as a means of providing plane, exposed, surface portions 39, 40, to conform with the plane surfaces at the ends of an ordinary stuffing-box in which the assembly may be mounted.

Should it be desired to assemble the rings of a packing assembly in a stuffing-box in a manner such as to be adapted to resist the flow of fluid in either of two directions, as illustrated in Fig. 8, this may readily be accomplished by dividing two rings cut from the coil 32 (Fig. 5) of material, such as is shown in Fig. 4, into separate parts such as are illustrated by Fig. 6, in order to provide two pairs of adapter rings, the adapter rings 38 being mounted at the center of the assembly with their concave surface portions 30 capping the convex portions 29 of adjacent rings 36 of the assembly, and the two adapter rings 37 being mounted at opposite ends of the assembly with their convex surface portions 29 nested within the concave surface portions 30 of the adjacent rings 36.

Packing material of the form of that illustrated by Figs. 9, 10 and 11 and the method of making the same differ from the method and material hereinbefore described only in that, when reassembling the severed parts of a strip of material such as is illustrated by Fig. 2, in preparation for the following molding and vulcanizing treatment, a thin ribbon of metal 41 is interposed, as indicated in Fig. 9, in association with the layer of tacky material 21 between the parts 25, 26 of the structure to be united. In view of the tacky nature of the unvulcanized material of the parts illustrated by Fig. 9, as well as of the thin layer of binding material, the reassembled parts may be united by a relatively slight degree of pressure so as to be handled as a unit during further treatment.

The molding and vulcanization of the reassembled packing structure illustrated by Fig. 9 will result in a product a fragment of which is shown in Fig. 10, which differs from that illustrated by Fig. 4 only as to the inclusion of the inserted metal ribbon 41, which is of a width such that it may be completely enveloped by material of the parts with which it is associated. Subsequent to the molding and vulcanization of the packing stock illustrated by Fig. 10, the metal strip may be removed, thus resulting in a modified form of stock a fragment of which is illustrated by Fig. 11, said modified form having its parts 25, 26 united by a pair of thin, relatively narrow layers of material 42 separated by the space 43 from which the metal strip was removed.

Packing rings and adapter rings may be cut from stock such as is illustrated by Fig. 11 and used exactly as in the case of the stock illustrated by Fig. 4, the thin, narrow strips of material 42 serving as the uniting means of relatively weak texture to facilitate the separation of the parts of the stock bearing the convex and concave surface portions.

Figure 12:
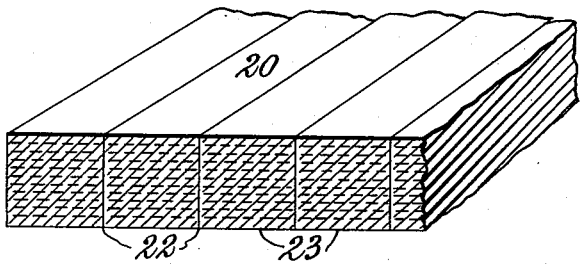
Fig. 12 represents a fragment of a slab of material from which may be cut a plurality of strips, each of which, by further treatment, may be developed into a second modified form of packing stock.

Packing material such as is illustrated by Figs. 12 to 16, inclusive, and the method of making the same differ from the materials and methods hereinbefore described, in that, as illustrated by Figs. 12 and 13, the thin layer of tacky material 21 is not applied to the slab 20 and is not, therefore, an element of the strip of material illustrated by Fig. 13.

In conformity with methods hereinbefore described, the slab 20 is cut into a plurality of strips 23 along planes 22, as indicated in Fig. 12, and the strip illustrated by Fig. 13 is severed longitudinally by a V-shaped cut 24 to produce the elements 25, 26 of forms approximating their intended forms as elements of the finished stock to be produced. These elements are then separated, and, as is indicated in Figs. 14 and 15, they are completely covered by layers of fabric 44, 45, which, due to the tacky nature of the unvulcanized material, may be readily caused to adhere to the same. The strip of fabric 44 of the element 25, as illustrated in Fig. 14, may preferably be of a width such as to overlap, as at 46, along the reentrant angle 28 of the element 25, and the strip of fabric 45 in which the element 26 is enveloped may preferably be of a width such as to overlap, as at 47, along the uncut plane surface of said part. The overlapping portions of the fabric may be caused to adhere by the application of suitable adherent material, after which the two elements illustrated by Figs. 14 and 15 may be molded to forms more closely approximating their intended forms as elements of the product to be produced, and partially vulcanized in order that they may be adapted to resist detrimental changes of form during subsequent steps of the treatment to produce the finished product.

The molded and partly vulcanized elements illustrated by Figs. 14 and 15 may be reassembled, as shown in cross section by Fig. 16, and united by the application of rubber cement, or any other suitable adherent, to their opposed, fabric-covered, uncut plane surfaces, the adherent used being such as to serve as a binding element of relatively weak textile properties after being subjected to the final process of vulcanization.

The reassembled elements as illustrated in Fig. 16 are subjected to further vulcanization to complete the curing of the united parts 25, 26, and to reduce them to their designed, finished forms, thus resulting in the production of stock which may be cut into rings for use as elements of packing assemblies and portions of which may be separated and used as adapter rings for the end elements of such packing assemblies in a manner which has been explained in detail as a part of the foregoing description in which reference has been made to Figs. 1 to 8, inclusive, of the drawings.

The material to be used in the manufacture of packing stock in accordance with the teachings of the herein disclosed invention may be of any appropriate type of rubber composition or other matter which, when subjected to a suitable curing treatment, may have the physical properties of resilient, vulcanized rubber composition. Such compositions may, if desired, include fibrous material of any appropriate character. The specific type of composition used will depend upon the conditions of service to which the packing may be expected to be subjected. One type of composition may be used if the packing is to be subjected to relatively high temperature. Another composition may be used if the packing is to be exposed to oils or other rubber solvents. Other compositions may be used if the packing is to be exposed to corrosive chemicals. The invention, however, is adapted for use in the making of any type of strip packing stock from which portions may be cut for use as elements of a packing assembly and of which any part of the stock may be separated and caused to serve as adapter elements for the ends of the assembly having surface portions adapted to conform with opposed surface portions of an enclosure in which the packing is to be used.

The invention is not intended to be limited to any of the specific methods which have been disclosed for purposes of illustration, but should be regarded as including modifications and variations thereof within the scope of the appended claims.

What is claimed is:

1. The method of making stock adapted for use as machinery packing that consists in preparing a strip of material which, by an appropriate curing treatment, may be caused to have the physical properties of resilient, vulcanized rubber composition, said strip being of approximately rectangular cross-sectional form; severing the said strip of material longitudinally by a V-shaped cut intermediate two of its oppositely disposed surfaces so as to produce two strips of forms approximating their intended forms as elements of a finished product, one having a protuberant angular portion and the other having a complemental reentrant angular portion; applying to the surface of one of said strips, opposite its cut surface, a thin layer of tacky material which, when vulcanized, will serve as a binding means of relatively weak texture as compared with that of the other parts of the stock to be united thereby; reassembling said strips with the surfaces opposite their cut surfaces opposed to each other but separated by the layer of tacky material by which they may be adherently united; subjecting the reassembled structure to a molding treatment such as to convert it into a designed, finished form of which the protuberant and reentrant angular surface portions are oppositely disposed, and are of complemental, cross-sectional configuration; and vulcanizing the molded product to the desired physical consistency.

2. The method of making stock adapted for use as machinery packing, as defined by claim 1, said method being further characterized in that the strip material to be cut into parts to be reassembled, and the application to such strip material of the thin layer of tacky material by which such parts are reunited, is prepared and effected by first producing a slab of material of the character and thickness of the strip material to be treated and of a width equal to the combined widths of a plurality of strips of such material, applying to one of the two surfaces of said slab of greatest area a thin layer of the tacky material, and then severing the slab lengthwise into a plurality of strips of the material to be treated.

3. The method of making stock adapted for use as machinery packing, as defined by claim 7, said method being further characterized in that the treated strip of material shall be of a length such that a plurality of packing rings may be cut therefrom and that said strip shall be developed in the form of a coil of a diameter appropriate for its intended use.

4. The method of making stock adapted for use as machinery packing, as defined by claim 7, said method being further characterized in that a thin ribbon of metal, of a width materially less than that of the opposed surfaces of the parts of the stock to be united, is interposed between said surfaces when said parts are superimposed, one upon the other, in preparation for molding and vulcanization, the said strip of metal being withdrawn subsequent to the molding and vulcanizing treatment, thus leaving a pair of spaced, thin, narrow layers of the material of relatively weak texture to serve as the binding means adapted to facilitate separation.

5. A method of making stock adapted for use as machinery packing that consists in preparing a strip of material which, by an appropriate curing treatment, may be caused to have the physical properties of resilient, vulcanized rubber composition, said strip being of approximately rectangular cross-sectional form; severing the said strip of material longitudinally by a V-shaped cut intermediate two of its oppositely disposed surfaces so as to produce two strips of forms approximating their intended forms as elements of a finished product, one having a protuberant angular portion and the other having a complemental reentrant angular portion; enveloping each of the severed strips within an adherently united covering of textile fabric; subjecting said fabric-covered strips to molding treatments such as to convert them into forms more closely approximating their intended forms as elements of a finished product, and vulcanizing said strips to a degree sufficient to prevent them from being detrimentally distorted during further treatment; applying to the cloth-covered surface of one of said strips, opposite its cut surface, a thin layer of tacky material which, when vulcanized, will serve as a binding means of relatively weak texture as compared with that of the other parts of the stock to be united thereby; assembling the two strips with the cloth-covered surfaces opposite their cut surfaces opposed to each other but separated by the layer of tacky material, previously applied to one of them, by which they may be adherently united; subjecting the assembled structure to a final molding treatment such as to convert it into a designed, finished form of which the protuberant and reentrant angular portions are oppositely disposed and are complemental, cross-sectional configuration; and further vulcanizing the finally molded assembly to complete the curing of the partly vulcanized strips.

6. The method of making stock adapted for use as machinery packing, as defined by claim 5, the said method being further characterized in that the strip material to be cut into parts, enveloped in fabric, and subjected to further treatment to produce the finished product, is prepared by first producing a slab of material of the character and thickness of the strip material to be treated and of a width equal to the combined widths of a plurality of strips of such material, and then severing the slab lengthwise into a plurality of strips of the material to be treated.

7. The method of making stock adapted for use as machinery packing that consists in preparing a strip of material which, by an appropriate curing treatment, may be caused to have the physical properties of resilient, vulcanized rubber composition, said strip being of approximately rectangular cross-sectional form; severing the said strip of material longitudinally by a V-shaped cut intermediate two of its oppositely disposed surfaces so as to produce two strips of forms approximating their intended forms as elements of a finished product, one having a protuberant angular portion and the other having a complemental reentrant angular portion; reassembling said severed strips in relative positions such that the surfaces opposite their cut surfaces will be directed towards each other and uniting them, as thus reassembled with their respective protuberant and reentrant angular portions directed away from each other, by means of interposed tacky material which, when vulcanized, will serve as a binding agent of relatively weak texture as compared with that of the other parts of the stock to be united thereby; subjecting the reassembled structure to a molding treatment such as to convert it into a designed, finished form of which its protuberant and reentrant angular portions are oppositely disposed, and are of complemental, cross-sectional configuration; and vulcanizing the molded product to the desired physical consistency.

CECIL R. HUBBARD.